Sept. 22, 1925.
V. C. ARMSTRONG
WELDED RAIL JOINT
Filed March 18, 1925     2 Sheets-Sheet 2
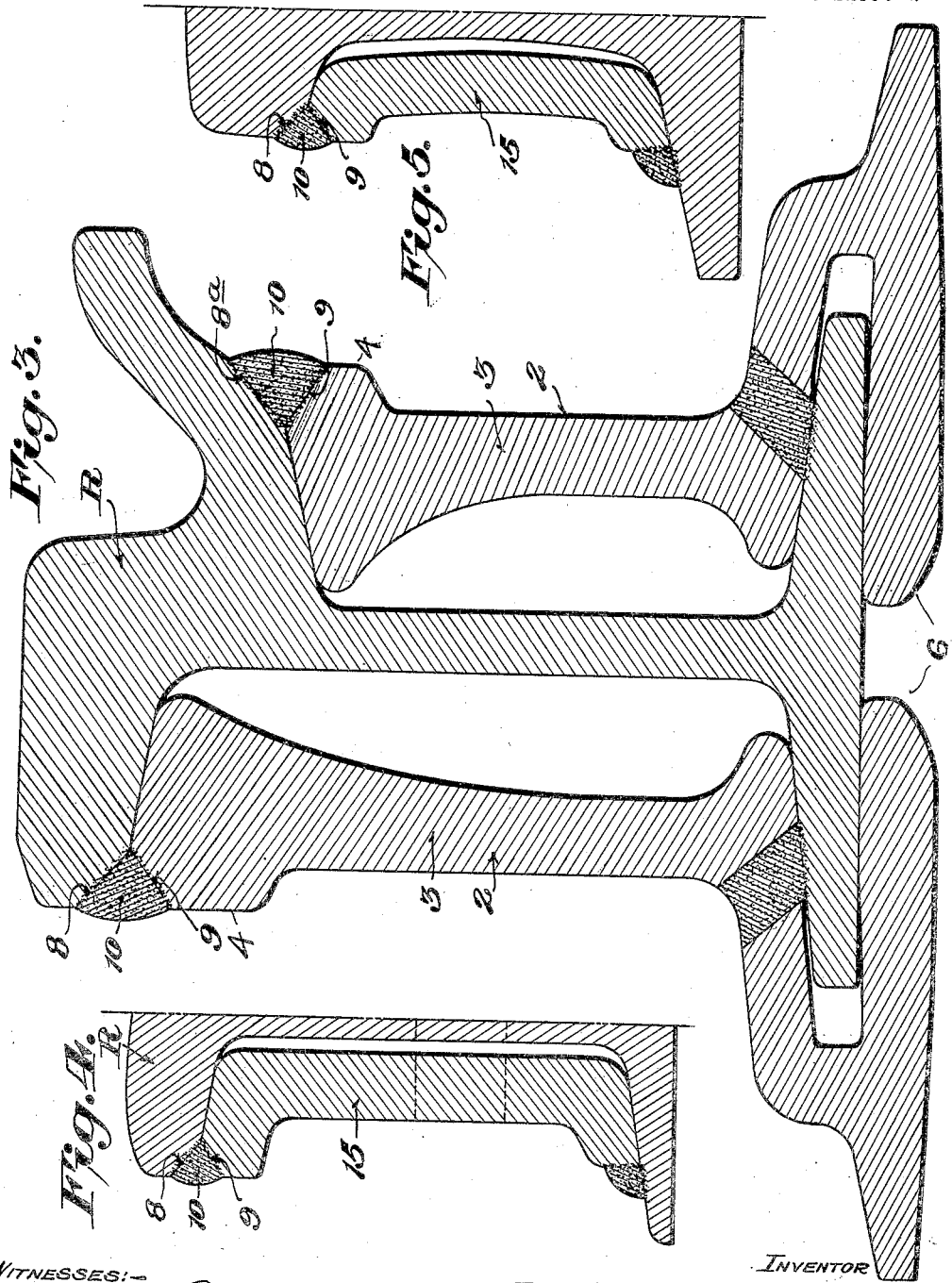

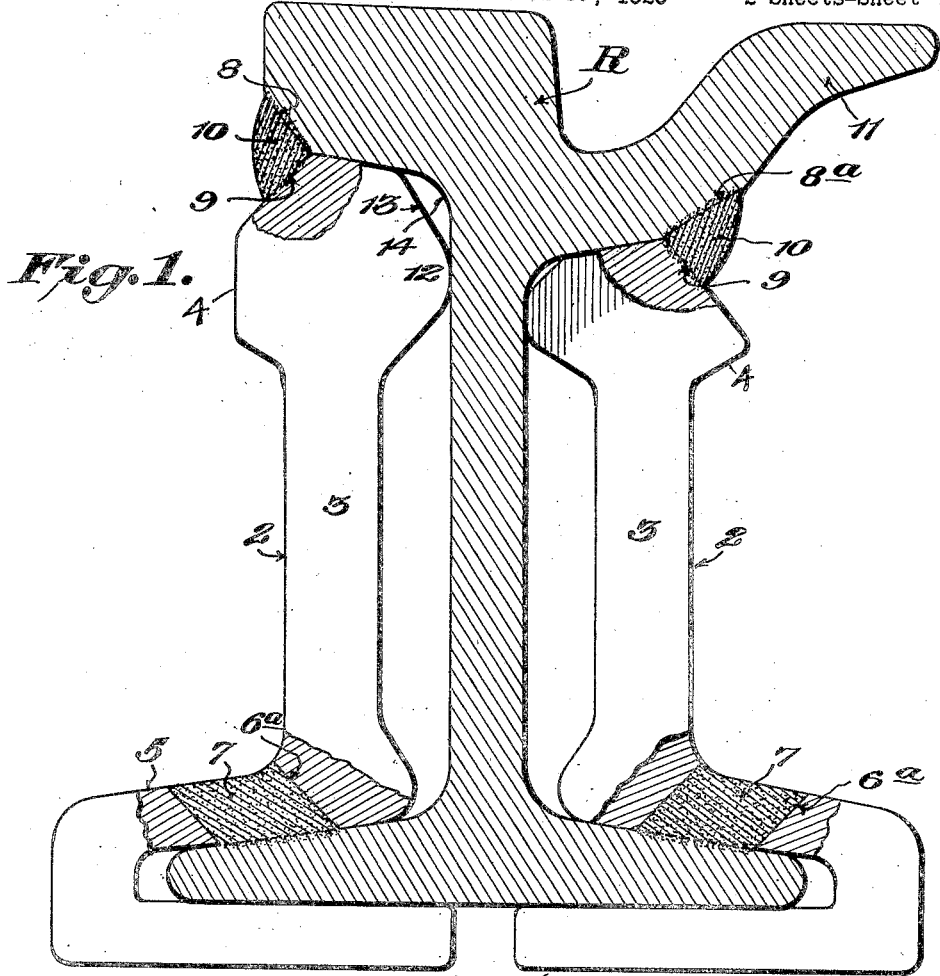
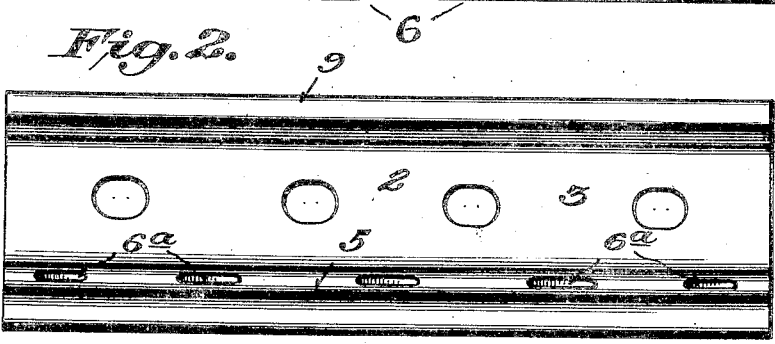

Patented Sept. 22, 1925.

1,554,944

UNITED STATES PATENT OFFICE.

VICTOR C. ARMSTRONG, OF HACKENSACK, NEW JERSEY, ASSIGNOR TO THE RAIL JOINT COMPANY, OF NEW YORK, N. Y., A CORPORATION OF NEW YORK.

WELDED RAIL JOINT.

Application filed March 18, 1925. Serial No. 16,560.

*To all whom it may concern:*

Be it known that I, VICTOR C. ARMSTRONG, a citizen of the United States, residing at Hackensack, in the county of Bergen and State of New Jersey, have invented certain new and useful Improvements in Welded Rail Joints, of which the following is a specification.

This invention relates to an improvement in welded rail joints, and has primarily for its object the provision of means whereby a readily accessible and exceptionally strong weld may be made between the head of the bar and the head of the rail, and also between the foot flange of the bar and the base flange of the rail.

In many forms of welded rail joints such structures are not well adapted for rolled sections, and frequently provide the welding recesses or spaces in such locations and positions as to make it difficult properly to apply the welding tools or appliances or to form a weld that will withstand the load and deflection stresses to which welded rail joint structures are subjected. Accordingly the present invention has in view utilizing the rail as well as the joint bar jointly to provide a welding space or recess for the head of the joint which is readily accessible, while at the same time providing a formation that furnishes an adequate amount of metal close to the welding zone to admit of a weld of larger capacity being made without any change in the construction or method of welding. Also the new construction permits of a substantial mass of metal being located in close proximity to the weld to control the action of the arc and assure the concentration and location of the final weld in the proper position. The effect therefore of the improvement contemplated by the present invention is to provide a weld of adequate strength, and also facilitating the application of the welding apparatus to make the welds.

Furthermore, the invention contemplates a novel means of welding the foot flange of the joint bar to the base flange of the rail in a manner that will dispose the weld well inward from the outer edge of the base flange of the rail so as to involve the thicker body of metal between the outer edge of the base flange and the fillet between said base flange and the lower part of the web of the rail.

Another desirable and important object of the invention resides in a novel head construction for the bar which has the desirable mechanical function of a substantial rail joint having the effect of jacking and lining up the two rails of the joint by the act of forcing the joint bars into place, and thus mechanically holding the rails in proper position and alignment until the welds are completed.

The invention is necessarily susceptible of structural modification without departing from the spirit or scope thereof, but preferred and practical embodiments thereof are shown in the accompanying drawings in which:—

Figure 1 is a sectional view of a girder type rail showing certain forms of continuous type rail joint bars welded thereto in accordance with the present invention.

Figure 2 is an elevation of the outside rail joint bar shown in Fig. 1 of the drawings, illustrating more particularly the provision which is made for locating the base welds at spaced intervals.

Figure 3 is a view similar to Fig. 1 showing a different type of girder rail and different type of continuous joint bar welded to the rail in accordance with the present invention.

Figure 4 is a sectional view of a rail joint applied to a girder rail illustrating another form of rail joint bar secured to the rail in accordance with the present invention.

Figure 5 is a similar view but showing the improvements applied to a standard form of T-rail.

In the embodiment of the invention shown in Figure 1 of the drawings a girder type rail is shown designated by the reference letter R and associated with this rail are the oppositely located joint bars 2—2 each of which is preferably of the continuous type. That is, of the type having an upright web 3, a head 4, a foot flange 5 and an inwardly extending rail supporting base flange 6. According to the present invention it is proposed to provide the outwardly and downwardly inclining foot flange 5 of each joint bar with a plurality of spaced welding holes or openings $6^a$ which expose the metal of the upper side of the rail base flange to the welding operation. These welding holes $6^a$ preferably pierce or extend through the foot flange of the joint bar at a downward and inward angle which disposes the inner portions of the holes in the thick part of the lower edge of the joint bar web which engages the upper side of the rail base flange. At the same time the inward slant or incline of the welding holes 6ª brings the same over the thicker part of the rail base flange thereby exposing a substantial mass of metal to the welding heat at the time the weld metal 7 is filled into the hole 6ª and welded to the metal of the rail base flange and to the metal of the foot flange of the joint bar. This important part of the invention is common to the forms of construction shown in Figs. 1, 2 and 3 of the drawings.

It is very desirable in providing the head weld for a welded rail joint to make a weld of exceptional strength while at the same time of as little projection as possible and readily accessible. These desirable features are made possible, according to the invention by deforming the head of the rail as at 8 to make a recess or groove which is intended to lie opposite a corresponding or complemental deformation 9 formed in the head of the joint bar. In a girder rail welded rail joint as shown in Figure 1 of the drawings it will be seen that the construction described for making the main head weld provides a well exposed and open welding groove bounded by the cut away or deformed portions 8 and 9 of the head of the rail and of the head of the bar located at the bottom corner of the rail head. This permits of easily making a head weld 10 of great strength and one that will substantially form and build up the contours of the head of the rail and of the head of the bar without substantial projection. At the opposite side of the girder rail the rail head recess or deformation 8ª is formed in the underside of the flange part 11 at one side of the main head of the rail. These deformations or cut away portions in both the rail head and the joint bars may be conveniently formed while these sections are being rolled in the mill. This head weld feature is an important feature of the invention and is common to all of the forms shown in the several figures of the drawings.

In addition to the novel base weld and head welds as above described an important mechanical feature of the invention is shown in Figure 1 of the drawings and consists in providing the head 4 of the joint bar at its inner side with a bearing projection 12 and with an inside cut away corner 13. The mechanical effect of this construction is that the inside cut away corner 13 will bridge the head fillet 14 of the rail and permit the bearing projection 12 to take a solid bearing against the web of the rail so that when the bolts or clamps are tightened to fit the joint bars to the rail the joint bars will line up the rails and stiffly hold them in their properly aligned positions until and while the welds are being made.

In the form of the invention shown in Fig. 4 of the drawings the novel head weld construction herein described is shown applied to a rolled form of joint bar 15 of the type and construction shown in and covered by the patent of Gailor No. 1,513,498, dated October 28, 1924, and Fig. 5 illustrates the Gailor type joint bar welded to the head of a standard T-rail in the manner contemplated by the present invention.

From the foregoing it is thought that the essential features of the invention will now be understood without further description, and also the various advantages.

I claim:

1. A welded rail joint including the rail head having a deformation, and the joint bar having a deformation lying opposite the rail head deformation.

2. A welded rail joint including the rail head having at the underside thereof a cut away or recessed portion, and the joint bar having at the top thereof a cut away or recessed portion complementally related to the corresponding portion of the rail head.

3. A welded rail joint including the rail head having at its bottom corner a cut away or recessed portion, and the joint bar having at its top corner a cut away or recessed portion complementally related to the corresponding portion of the rail head.

4. A welded rail joint including the rail having a cut away or recessed portion, and the joint bar having a cut away or recessed portion complementally related to the corresponding portion of the rail.

5. A welded rail joint including the rail and the joint bar having in its foot flange a welding hole extending downwardly and inwardly at an inclination to the metal at the bottom of the web of the joint bar.

In testimony whereof I hereunto affix my signature.

VICTOR C. ARMSTRONG.